UNITED STATES PATENT OFFICE.

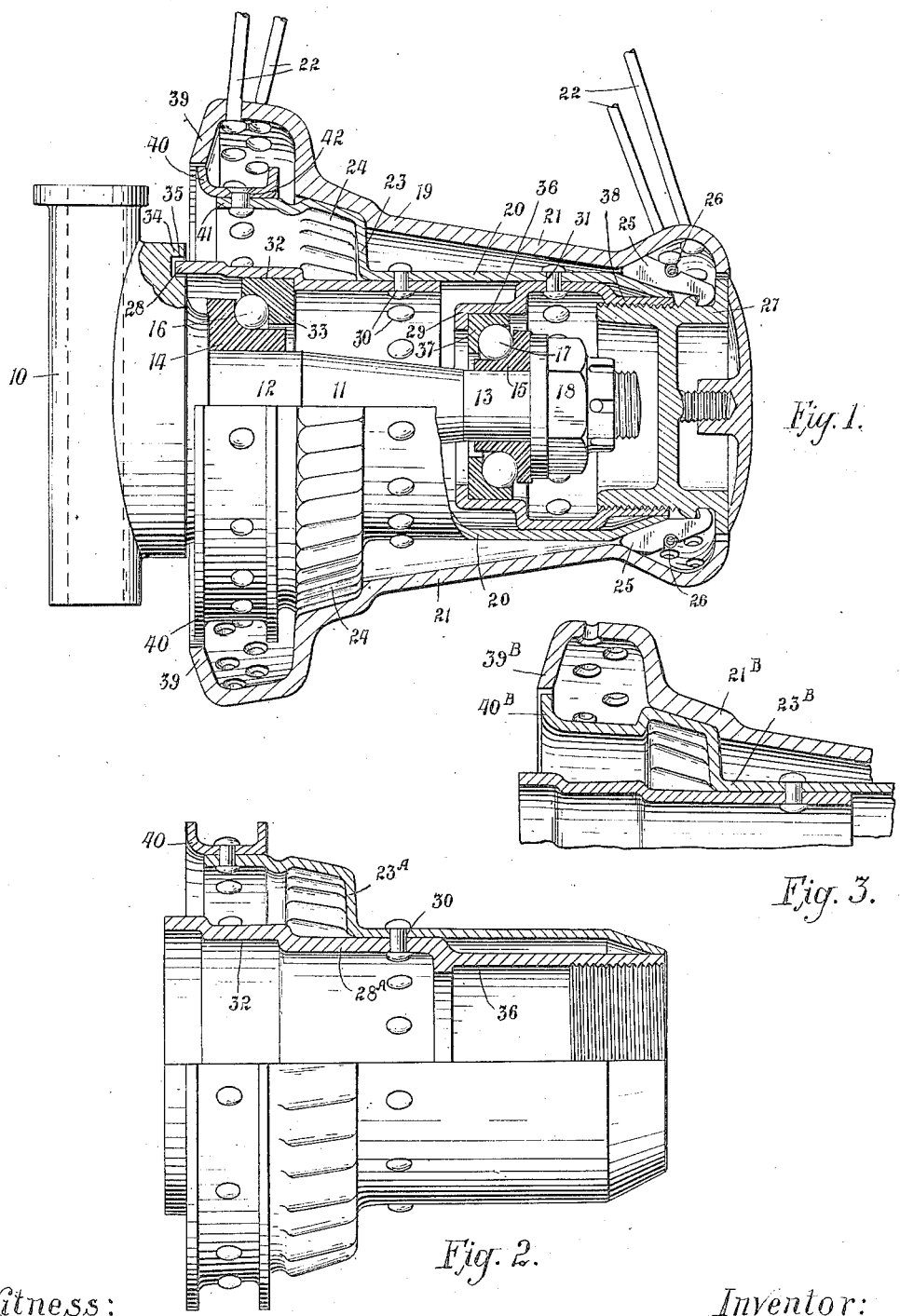

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,377,861. Specification of Letters Patent. Patented May 10, 1921.

Application filed July 24, 1916. Serial No. 110,877.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles and particularly to the wheels and axles thereof.

One of the objects of the present invention is to provide a wheel hub of built-up construction whereby a light and strong hub is obtained.

Another object of the invention is to provide a wheel hub in which the inner member thereof is composed of several metal parts rigidly secured together.

Other objects of the invention will appear from the following description taken in connection with the drawings which form a part of this specification, and in which:—

Figure 1 is a vertical section and part elevation of a motor vehicle axle and wheel built in accordance with this invention;

Fig. 2 is a longitudinal section and part elevation of another form of inner hub; and Fig. 3 is a fragmentary view showing a modification.

Referring to the drawings, 10 represents a steering knuckle of a motor vehicle axle, this knuckle being adapted when properly mounted, to swing about a substantially vertical axis. The projecting part of the knuckle is in the form of a spindle 11 which has separated seats 12 and 13 for the inner races 14 and 15 of a pair of separated annular ball bearings 16 and 17. These bearings are adjustably retained in place on the spindle by means of a nut 18 screwed on the outer end of the spindle.

A wheel 19 is mounted to rotate on the bearings above referred to and as shown it is of the wire laced type and comprises inner and outer hub members which are detachably secured together for ready removal of the outer member from the inner member for replacing a wheel having a punctured or injured tire. The inner hub member is indicated generally at 20 and the outer hub member at 21. The wheel spokes are shown at 22.

The inner hub member, as shown in Fig. 1, is composed of a part 23 which is adapted to receive the outer hub member 21, the latter having a bearing thereon on the conical fluted portion 24. There are also teeth or projections on the inner face of the outer member 21, corresponding to the fluted portion 24 of the inner hub member, so that there may be no relative turning of one of the members on the other.

The outer hub member is detachably retained upon the inner hub member by a suitable locking device, and in the form shown it comprises a series of dogs 25, having a retaining spring 26 and adapted to be wedged into position between suitable conical surfaces of the inner and outer hub members by means of a locking cap or ring 27, which is threaded into the inner hub member as shown.

In the form shown in Fig. 1, the inner hub member is also composed of two bearing supporting parts 28 and 29, the former being riveted to the middle of the part 20 as at 30, and the latter being riveted or otherwise rigidly secured to the part 20 adjacent its outer end, as shown at 31. The part 28 has an annular seat 32 for the outer race or ring 33 of the bearing 16, and it extends inwardly adjacent an enlargement 34 on the steering knuckle pin. If desired the enlargement 34 may be formed with an annular recess 35 into which the part 28 extends, thereby forming a better protection for the bearings inside the hub.

The part 29 above referred to, has an annular seat 36 for the outer race or ring 37 of the bearing 17, and an outwardly extending portion 38 of said part 29 is internally threaded to receive the locking cap 27 above referred to.

It will be seen that the annular seats 32 and 36 above referred to for the bearings 16 and 17 respectively, are spaced from each other and are each separated from the outer part 23 of the inner hub member. This gives more or less elasticity to the hub without, however, weakening it in any way.

The inner end of the outer hub member 21 is formed with an inwardly extending flange 39, which is adapted to coöperate with an outwardly opening annular channel piece 40, secured to the inner end 41 of the part 23 of the inner hub member. This channel piece is shown in Fig. 1 as formed separately from the part 23 of the inner hub member and rigidly secured thereto as by the rivets 42. In case the outer hub member should be accidentally detached from the inner hub member when the vehicle is moving, the flange 39 of the outer hub member would be caught in the channel piece 40 and the wheel would be prevented from flying off. This is a safety provision of importance.

In Fig. 2 only the inner hub member is shown. It is composed of two principal parts of tubular form, one being telescoped within the other and the two parts being rigidly secured together at their middle portions. These parts are indicated respectively as 23$^A$ and 28$^A$, and they are secured together by rivets 30. The ball bearing seats 32 and 36 are positioned in the part 28$^A$ similarly to that shown in Fig. 1. Also the channel piece 40 is secured to the part 23$^A$ as in Fig. 1.

In Fig. 3 the channel piece 40$^B$ is formed as an integral part of the inner hub part 23$^B$. In this showing the channel piece is of slightly smaller diameter than in the other two figures, but its purpose and operation are the same. Of course, the inwardly extending flange 39$^B$ on the outer hub part 21$^B$ is made to closely fit over the channel piece as in the other form.

It will be understood that the invention is not limited to details of construction shown.

Having thus described my invention, what I claim and desire to secure by Letters Patent is:—

1. A wheel hub comprising an inner member composed of a part adapted to receive an outer hub member in concentric relation therewith, an annular channel on said first part opening outwardly and adapted to receive a flanged portion of such outer hub member when the latter is in eccentric relation with the inner member, and a separately formed part adapted to receive the wheel supporting bearing, said parts being rigidly and permanently secured together, and an outer member adapted to be removably secured to the inner member and having an inturned flange adapted to coöperate with said channel part.

2. A wheel hub comprising an inner member composed of a plurality of parts, one of said parts adapted to receive an outer hub member, a second of said parts secured to said first part and forming an outwardly opening channel adapted to receive a flanged portion of such outer hub member when the latter is in eccentric relation with the inner member, and another of said parts secured to said first part and adapted to receive the wheel supporting bearing, and an outer member adapted to be removably secured to the inner member and having an inturned flange adapted to coöperate with said channel part.

3. A wheel hub comprising an inner member composed of a plurality of parts, one of said parts adapted to receive an outer hub member, a second of said parts secured to said first part and forming an outwardly opening channel adapted to receive a flanged portion of such outer hub member when the latter is in eccentric relation with the inner member, and two others of said parts each secured to said first part and adapted to receive the wheel supporting bearing, and an outer member adapted to be removably secured to the inner member and having an inturned flange adapted to coöperate with said channel part.

4. A wheel hub comprising an inner member composed of a part adapted to receive an outer hub member in concentric relation therewith and an annular channel part separately formed and secured to the first said part, said channel part opening outwardly and adapted to receive a flanged portion of such outer hub member when the latter is in eccentric relation with the inner member, and an outer member adapted to be removably secured to the inner member and having an inturned flange adapted to coöperate with said channel part.

In testimony whereof I affix my signature.

MILTON TIBBETTS.